United States Patent [19]

Bedard

[11] Patent Number: 5,793,438

[45] Date of Patent: Aug. 11, 1998

[54] ELECTRONIC PROGRAM GUIDE WITH ENHANCED PRESENTATION

[75] Inventor: Karen Bedard, San Jose, Calif.

[73] Assignee: Hyundai Electronics America, San Jose, Calif.

[21] Appl. No.: 627,176

[22] Filed: Apr. 3, 1996

Related U.S. Application Data

[63] Continuation-in-part of Ser. No. 556,624, Nov. 10, 1995.

[51] Int. Cl.⁶ .................................................. H04N 5/445
[52] U.S. Cl. .......................... 348/569; 348/564; 348/561; 348/906
[58] Field of Search .............................. 348/563, 564, 348/568, 569, 561, 406, 10, 6; H04N 5/445, 5/45

[56] References Cited

U.S. PATENT DOCUMENTS

| | | | |
|---|---|---|---|
| 4,663,615 | 5/1987 | Hernandez et al. | |
| 4,951,840 | 8/1990 | Curtis et al. | |
| 4,977,455 | 12/1990 | Young | 358/142 |
| 5,353,121 | 10/1994 | Young et al. | 348/563 |
| 5,477,262 | 12/1995 | Banker et al. | 348/7 |
| 5,479,266 | 12/1995 | Young et al. | 358/335 |
| 5,479,268 | 12/1995 | Young et al. | 358/335 |
| 5,539,479 | 7/1996 | Bertram | |
| 5,559,550 | 9/1996 | Mankovitz | |
| 5,585,838 | 12/1996 | Lawler et al. | |
| 5,585,866 | 12/1996 | Miller et al. | |

FOREIGN PATENT DOCUMENTS

| | | |
|---|---|---|
| WO 91/07050 | 5/1991 | WIPO . |
| WO 92/04801 | 3/1992 | WIPO . |
| WO 94/29811 | 12/1994 | WIPO . |
| WO 95/07003 | 3/1995 | WIPO . |
| WO 95/28799 | 10/1995 | WIPO . |
| WO 95/31069 | 11/1995 | WIPO . |

*Primary Examiner*—Michael H. Lee
*Attorney, Agent, or Firm*—Townsend and Townsend and Crew LLP

[57] ABSTRACT

An intuitively operated Electronic Program Guide (EPG) which presents program guide information in table form at two levels of resolution. Schedule information is presented in icon form over a long time window while textual information is presented for a viewer-selected time slot. The selected time slot may appear to be a magnified representation of the long time window view. In this way, a television screen of conventional resolution may present at least five hours of schedule information for eight channels. The viewer may operate the Electronic Program Guide (EPG) intuitively with simple remote control commands.

23 Claims, 6 Drawing Sheets

| | 6:00 | 6:30 | 7:00 | 7:30 | 8:00 | 8:30 | 9:00 | 9:30 | 10:00 | 10:30 | 11:00 | 11:30 |
|---|---|---|---|---|---|---|---|---|---|---|---|---|
| | | | | | | | Monday Night | | | | | |
| 2 | Married | Coach | Married | Love Con | Encounters | | The Great Defender | | News | | Cheers | MASH |
| 4 | News | | Hard | Entertain | Fr Prince | House | Movie: A Family Torn Apart ('93) ★★ | | News | | News | Tonight |
| 5 | News | EXTRA | Nanny | Dave's | Murphy | Cybill | Chicago Hope | | News | | Late Show | |
| 7 | News | | Jeopardy | Wheel | Off Camera/Dean | | Movie: An Inconvenient Woman (Part 2)('91) ★★ | | News | | News | Nightline |
| 8 | News | | Jeopardy | Wheel | Fr Prince | In House | Movie: A Family Torn Apart ('93) ★★ | | News | | News | Tonight |
| 9 | MacNeil/Lehrer News | | Business | Served? | MGM Lion Roars | | Battlefield: The Battle of Normandy | | National Geographic | | | |
| 11 | News | Inside Ed | Entertain | EXTRA | Off Camera/Dean | | Movie: An Inconvenent Woman(Part 2)('91) | | News | | News | Nightline |
| 14 | Noticias | Noticiero | Caminos Cruzados | | La Duena | | Alondra | | Cnsbna . Especial | | Noticiau | Moacto |
| 20 | Beverly Hill 90210 | | Patrol | Patrol | Rigntancer | | Renegade | | Wonder | Rescue | Top Cops | Top Cops |
| 26 | Medows | TV Patrol | Vietnam | Korean | Cantonese News | | Mandarin | Cantonese | Drama | Variety | Tokyo | Abba. |
| 30 | Movie: Marco ('73) | | NWA Wrestling | | H. Nero | Bob Cum | A. News | Paid Prog | Video Review | | Music Video | |
| 35 | News | MASH | Roseanne | Simpsons | Encounters | | The Great Pretender | | News | | Charles Rose | |
| 36 | Cosby | Different | Fr Prince | Cosby | Movie: Victim of Love ('91) ★★ | | | | Northwest Exposure | | Focus | Paid Prg. |
| 38 | Philippine | Vien Chao | | Drama | Worldwide News | | Cantonese Movie | | Mandarin Movie | | | |
| 44 | Simpsons | Roseanne | Star Trek: Next Gen | | Star Trek: Voyager | | Legend | | Cops | Cops | Star Trek | |
| 46 | News | Coach | Cops | Current | Nanny | Dave's | Murphy | Cybill | Chicago Hope | | News | Late Show |
| 48 | Noticiero | Noticias | Banda, Bando | | Ocumo | | Movie: El Padrano Es Mi... | | Pura Sangre | | Noticias | Ad Hits |
| 54 | TN News | Appear | Served | EastEnd | Positive Thinking | | Malone | Souls | Despair | Face/Evu | MacNeal/Lehrer News | |
| 60 | Japan | Wash. | Souls | Quiet | Mystery (Part 1 of 4) | | Toshiko Toxmazu | | Eiko: Cowboy | | POW | |
| 65 | Paid Prg. | Paid Prg. | Paid Prg. | Paid Prg. | Paid Prg. | Pad Prg. | Paid Prg. | Paid Prg. | Paid Prg. | Paid Prg. | Worship | |

FIG. 1. (PRIOR ART)

| SEP 7 | MON | TUE | WED | THU | FRI | SAT | SUN |
|---|---|---|---|---|---|---|---|
| | 9:00 | | | 9:30 | | 10:00 | |
| CNN | Larry King Live | | | | | World News | |
| SHOW | City Slickers | | | | | The Search | |
| HBO | Bingo | | | Home Alone | | | |
| DISC | All In a Days Work | | | | | All In a Days Work | |
| Ed | Math....Who Needs It? | | | | | Rassiasilh | |
| ESPN | Major League Baseball | | | | | | |
| FAM | Batman | | | | | Startrek | |
| E | In the Best Interest of | | | | | News | |
| DISNE | Casablanca | | | | | Gaslight | |
| PEV | Juice | | | | | | |

| 26 | KBHL-TD0 | CBL | 26 | 7:25 P | MON SEP |

FIG. 2. (PRIOR ART)

ELECTRONIC PROGRAM GUIDE WITH ENHANCED PRESENTATION

STATEMENT OF RELATED APPLICATIONS

This application is a continuation-in-part of U.S. application Ser. No. 08/556,624, filed Nov. 10, 1995.

EXAMPLE FIGURES

The present application includes Figures showing one instantiation of a program guide display in accordance with the invention. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to electronic presentation of television program guide information, and more particularly to a method and apparatus for making optimal use of available screen area in presenting automatic program guide information.

Since the inception of television, the number of available channels has steadily increased. The inauguration of the UHF band for broadcast use, the development of the cable television infrastructure, and the introduction of readily available direct satellite reception have all brought increases in the number of available programs.

The proliferation of television channels brings with it a greater variety of programming but also complicates the viewer's task in learning what programming is available at any particular time and on what channel it is available. The most common approach is the paper television programming guide, available as either an independent publication or as a supplement to the local newspaper. FIG. 1 depicts a typical paper presentation of a television programming guide for a single evening of programming. A printed table has multiple columns each corresponding to a half hour time slot and multiple rows, each corresponding to a different television channel. Each table entry identifies the television program appearing on the identified channel during the identified time slot.

Paper presentation of television programming information has many drawbacks however. The schedule may change, rendering the guide obsolete without notification of the viewer. The available channels may vary depending on the viewer's particular cable system or satellite link and his or her service level. Furthermore, even if the viewer is only interested in certain programs, he or she must nonetheless search through the entire table for programs of interest. Also, the paper program guide may not be available to the viewer because it has been lost or never acquired.

To address at least some of these shortcomings, Electronic Program Guides have been proposed, developed, and implemented. Several such Guides have directly adopted the grid of FIG. 1. An example of such a Guide is depicted in FIG. 2. Because of the resolution limitations of the television screen, and viewing distance, the viewer can only see 1.5 hours of programming at a time for approximately 7 channels.

Another approach to Electronic Program Guides is to take viewers through a lengthy and cumbersome hierarchy of screens of categories. At each screen, the viewer is prompted to select a category. Finally, the viewer is shown a sequential list of programs.

What is needed is a system for presenting program information which may be used with conventional television screens, which presents needed schedule information at a glance, and which operates intuitively.

SUMMARY OF THE INVENTION

The present invention provides an intuitively operated Electronic Program Guide (EPG) which presents program guide information in table form at two levels of resolution. Schedule information is presented in icon form over a long time window while textual information is presented for a viewer-selected time slot. The selected time slot may appear to be a magnified representation of the long time window view. In this way, a television screen of conventional resolution may present at least five hours of schedule information for eight channels. The viewer may operate the Electronic Program Guide (EPG) of the present invention intuitively with simple remote control commands.

In accordance with a first aspect of the invention, an apparatus for displaying program guide information on a screen of a television includes means for displaying a table of program information on the screen. A first axis of the table represents a time of transmission, a second axis of the table represents a channel. An entry of the table includes an icon representing a class of program to be transmitted on the channel at the time represented by the position of the entry. The apparatus further includes means for receiving user input specifying a transmission time of particular interest and means for overlaying, over a section of the table corresponding to the transmission time of particular interest, a plurality of magnified text entries. Each text entry includes text representing the program to be transmitted at the transmission time of particular interest on the channel represented by the position of the text entry.

The invention will be better understood by reference to the following detailed description in connection with the accompanying drawings.

BRIEF DESCRIPTION OF THE DRAWINGS

FIG. 1 depicts a prior art program guide as would be found in a paper publication.

FIG. 2 depicts a prior art electronic version of the program guide of FIG. 1.

DESCRIPTION OF SPECIFIC EMBODIMENTS

Figure 3A:
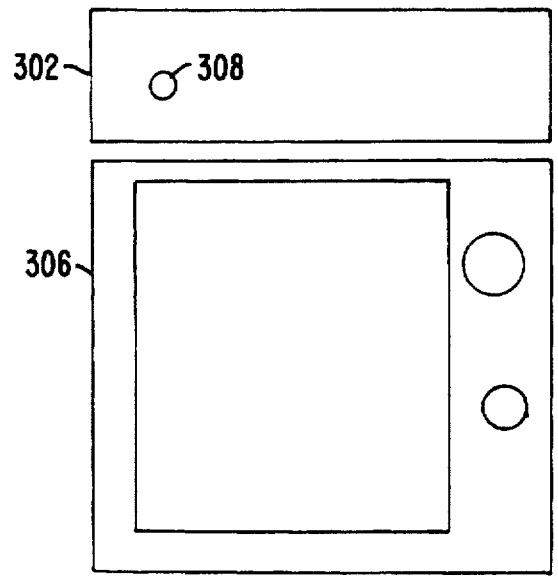
FIG. 3A depicts an exemplary settop unit/television combination suitable for implementing the present invention.

FIG. 3A depicts a settop unit/television combination suitable for implementing the present invention. A settop unit 302 is coupled to a broadcast medium (not shown) and to a broadcast signal input of a television 306. Settop unit 302 operates to select a particular channel to be received and display programming of that channel through television 306. Settop unit 302 preferably includes an IR receiver 308 operative to receive remote control signals from a remote control unit. Thus a viewer may select a particular channel to be received by commanding settop unit 302 via remote control or by operating controls (not shown) on settop unit 302. Settop unit 302 also incorporates circuitry to allow it to generate its own displays to show on the screen of television 306.

Of course, a settop unit is only one possible apparatus for implementing the present invention. For example, all or part of the electronic program guide generating system of the present invention may be located within television 306 or within an interactive television network coupled to settop unit 302. Settop unit 302 may be understood as being but one type of terminal adapter coupling a display terminal to a medium carrying a plurality of information streams such as video programs. Thus, a computer coupled to a network and a monitor could also be used to implement the present invention.

Figure 3C:
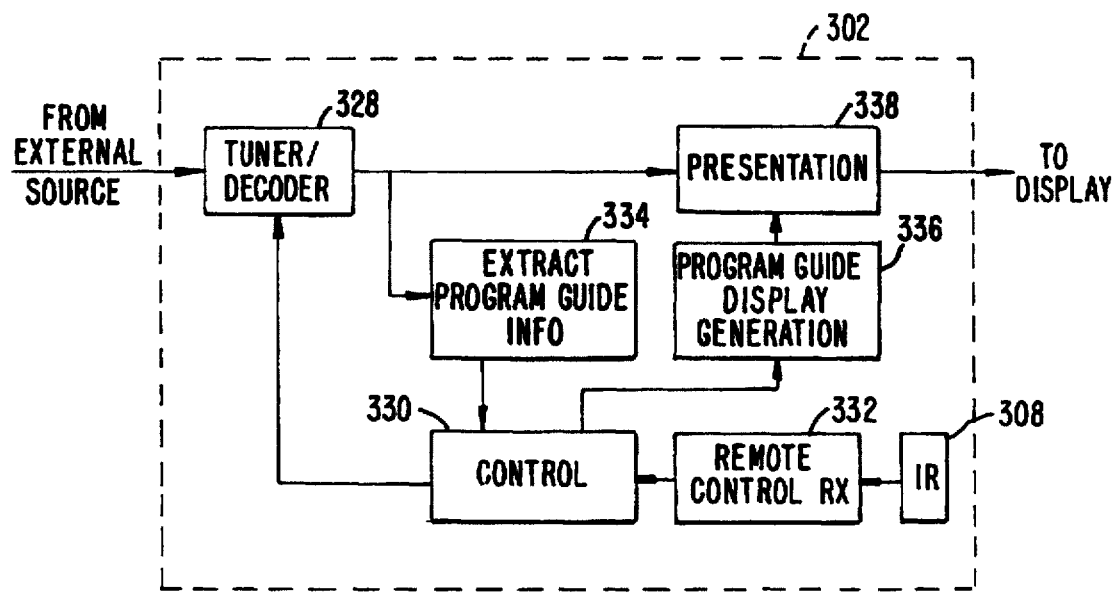
FIG. 3C depicts a simplified representation of the operation of internal circuitry of settop unit 302.
Figure 3B:
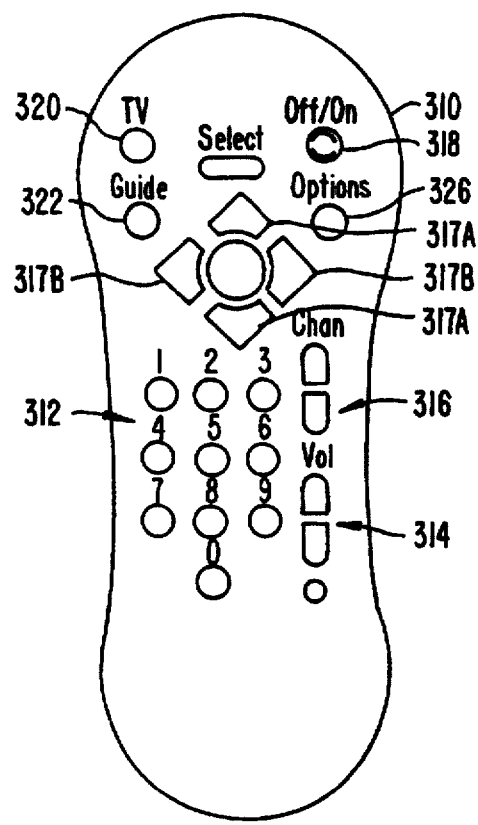
FIG. 3B depicts an exemplary remote control unit suitable for use in conjunction with the present invention.

FIG. 3B depicts an exemplary remote control unit 310 suitable for use in accordance with a preferred embodiment of the invention. Remote control unit 310 includes a numeric keypad 312, volume controls 314, channel controls 316, vertical cursor arrow keys 317A and horizontal cursor arrow keys 317B, an Off/on switch 318, a TV button 320, a Guide button 322, a Select button 324, and an Options button 326. Off/on switch 318 may be used to turn the settop unit on and off. Numeric keypad 312 and/or channel controls 316 may be used for channel selection. Volume controls 314 may be used to adjust volume. The operation of TV button 320, Guide button 322, Select button 324, and Options button 326 will be explained in reference to the following description.

FIG. 3C depicts a simplified representation of the operation of internal circuitry of settop unit 302. Settop unit 302 includes a tuner/decoder 328, a control unit 330, a remote control receiver 332, a program guide information extraction unit 334, a program guide display generation unit 336, and a presentation unit 338. Remote control receiver 332 to is coupled to IR receiver 308 and converts the received IR signals to electric command signals which are input to control unit 330. Control unit 330 coordinates the general operation of settop unit 302. Control unit 330 preferably incorporates a microprocessor or microcontroller. One function of control 330 is to generate a channel selection control signal to tuner/decoder 328. Tuner/decoder 328 receives the external information signal such as a video signal and isolates a desired channel in accordance with the channel selection control signal.

Program guide extraction unit 334 isolates program guide information from the received signal. In one embodiment, this information is extracted from the blanking intervals of the currently selected channel. There are of course other ways that the program guide information could be multiplexed with video information to display. In an alternative embodiment, tuner/decoder 328 may be shifted to a special program guide information channel which transmits only program guide information.

Control unit 330 also directs program guide display generation unit 336 to generate electronic program displays and prompts in response to the program guide information made available by program guide extraction unit 334 and the user commands received via remote control receiver 332. Presentation unit 336 combines the program guide display generated by display generation unit 336 with the video signal received from tuner/decoder 328 to produce a video signal for display. Certain prompts and displays may be superimposed over video programming of the selected channel. Other displays may occupy the entire screen and thus substitute entirely for the selected channel.

Further detail of the internal design of settop unit 302 will be apparent to those of skill in the art and is not further discussed herein. Any combination of hardware or software may be used to implement the functions of settop unit 302.

In accordance with the invention, various categories of programming are assigned category icons. In one embodiment, these icons are symbols representing the programming category. For example, movies are represented by a movie camera icon, and musical programs are represented by a musical note icon. In an alternative embodiment, these icons are blocks of pixels or even individual pixels having a color that represents the programming category. For example, blue may represent news programming while violet represents movies.

Figure 4:
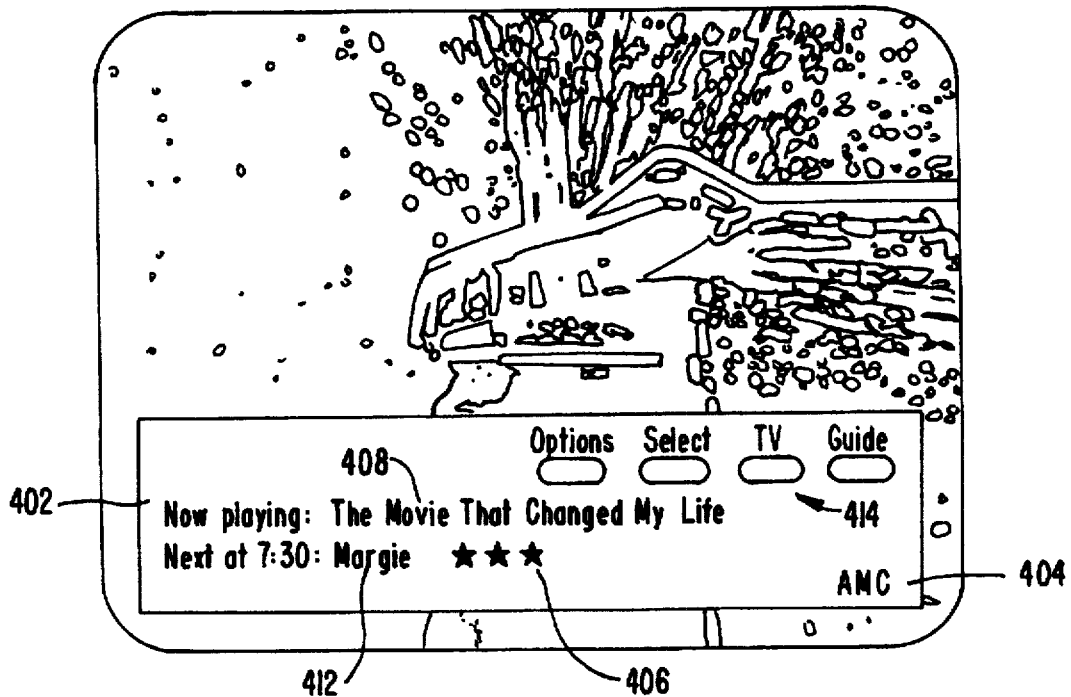
FIG. 4 depicts a display showing information on a currently viewed program.

FIG. 4 depicts an overlaid display 402 generated by settop unit 302 when a viewer depresses Guide button 322 on remote control unit 310 while viewing typical television programming on television 306. Overlaid display 402 includes a station ID 404, category icon 406 and name 408 of the current program, on the current channel, and the icon 410 and name 412 of the next program on the current channel. Overlaid display 402 further shows images 414 of the Guide, Select, and Option button to remind the viewer that particular functions of these buttons are now enabled.

Depression of TV button 320 will end the display of the guide information. Operating the channel control buttons 312 or numeric keypad 316 will show similar information about other channels. Depression of Select button 324 will cause settop unit 302 to tune to the channel for which information is to be displayed. Depressing Options button 326 will generate another display (not shown) allowing the viewer to set preferences. Depressing Guide button 322 again results in a full Electronic Program Guide display in accordance with the invention.

Figure 5:
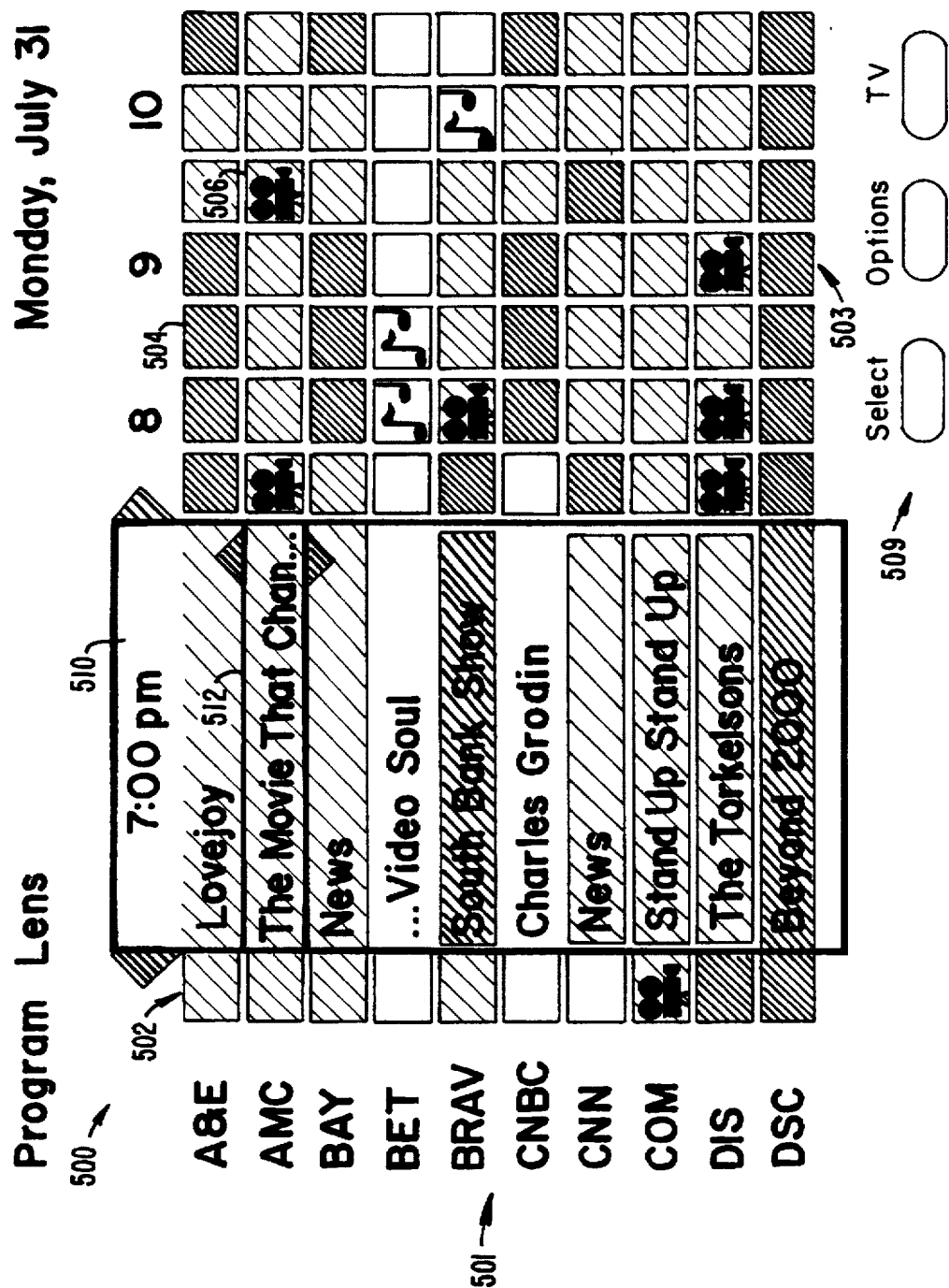
FIG. 5 depicts a display showing Electronic Program Guide information in accordance with one embodiment of the present invention.

FIG. 5 depicts an Electronic Program Guide display 500 as generated by settop unit 302 in accordance with one embodiment of the present invention. Display 500 includes a table 502 wherein rows 501 of the table represent available television channels and columns 503 represent half hour time slots. Each table entry is an icon representing a category of television programming. Display 500 also includes a representation 509 of the Select, Options, and TV buttons.

To aid in illustrating possible implementations of the present invention, FIG. 5 shows two different styles of icon. Some icons such as icon 504 are simply colored blocks representing a particular category of programming. Other icons are also colored blocks but have superimposed symbols representing categories of programming. Icon 506, a movie camera, represents movies. An icon 508, a pair of musical notes, represents musical programming. Preferably, different icons are provided for each of the programming categories provided by the digital video broadcasting standard.

Since the icons are small, a long time frame of programming may be displayed on the screen of television 306. An implementation relying on colored blocks exclusively rather than superimposed symbols accommodates an even longer time frame by shrinking block size to the minimum visible size.

Numerous other icon styles are also possible within the scope of the present invention. For example, although, FIG.

5 shows an individual icon for each half hour slot, it would also be possible to use a single icon for each program. The icons may then be colored rectangles occupying the full time slot for the program with the color representing the program category. The section of the rectangle occupying the beginning time slot may also include a shape representing the program category.

Overlaid over table 502 is a magnified table 510 listing more detailed information relating to the programs broadcast in a particular half hour time slot. Magnified table 510 is aligned with table 502 but is wider than a single column of table 502. Each entry of magnified table 510 includes the title of the programming displayed at that time. By operating horizontal cursor arrow keys 317B, the viewer may shift magnified table 510 along table 502 to display the titles of programming broadcast at other time slots. Further shifting of magnified table 510 beyond the displayed time slots will cause the range of displayed time slots to change. Magnified table 510 can be understood as a magnifying lens which may be shifted over table 502. In one embodiment, the titles of individual channels appear at the edge of magnified table 510 rather than at the edge of table 502.

One entry 512 of second display 510 has highlighted borders. By manipulating vertical cursor arrow keys 317A, the viewer may select which entry is highlighted. Further shifting of cursor arrow keys 317A beyond the displayed channels will cause the range of displayed channels to change. Depression of Select button 324 causes further information about the highlighted program to appear as shown in FIG. 6.

Figure 6:
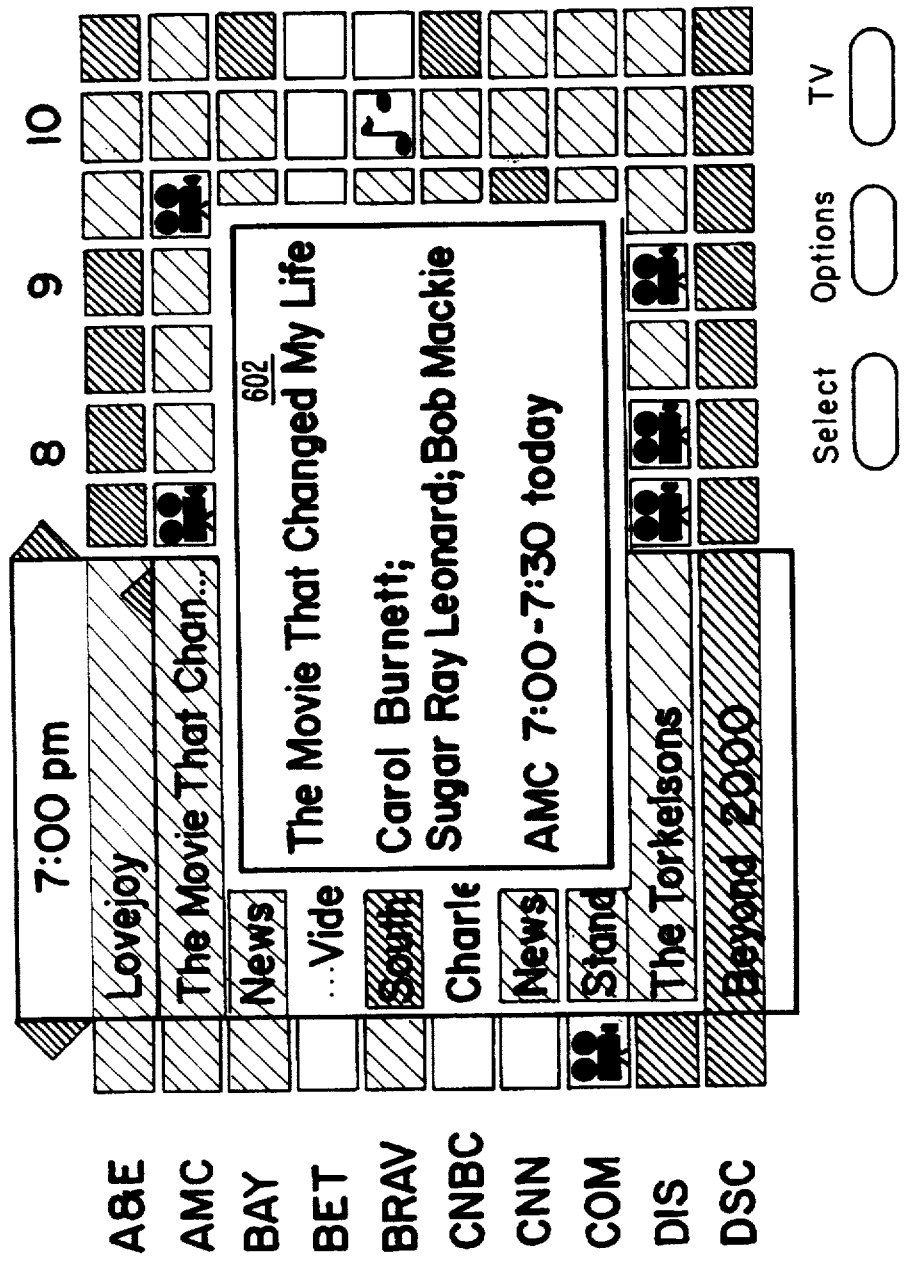
FIG. 6 depicts a display showing Electronic Program Guide information along with specific information about a particular program.

FIG. 6 shows the display of FIG. 5 with another overlaid display 602 with more information about the highlighted program. Depressing Select button 324 once again causes settop unit 302 to tune to the selected program.

At any point during the EPG display, pressing Options button 326 will result in a new display for selecting preferences and changing the day displayed. For example, the viewer can elect to view schedule information only for a certain category of programming. At any point during the EPG display, pressing TV button 320 returns the programming that preceded the EPG display.

Although, the above description has explained EPG display operation with reference to use of a remote control unit, any control scheme may be used to operate the display. For example, any pointing device, including a mouse, trackball, or joystick could readily substitute for the cursor arrow keys. Other functions provided by buttons on remote control unit 306 may be provided by pull-down menus or by displayed virtual buttons.

While the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. Apparatus for displaying program guide information on a screen, said apparatus comprising:

means for displaying a table of program information on said screen, a first axis of said table representing a time of transmission, a second axis of said table representing a channel, wherein an entry of said table comprises an icon representing a class of program to be transmitted on the channel at the time represented by the position of said entry;

means for receiving user input specifying a transmission time of particular interest; and means for overlaying, over a section of said table corresponding to said transmission time of particular interest, a plurality of magnified text entries, each text entry including text representing the program to be transmitted at the transmission time of particular interest on the channel represented by the position of said text entry.

2. The apparatus of claim 1 wherein said icon comprises a shape representing a class of program to be transmitted.

3. The apparatus of claim 1 wherein said icon comprises a block having a color representing a class of program to be transmitted.

4. The apparatus of claim 1 further comprising means for storing said program information.

5. The apparatus of claim 1 further comprising means for receiving said program information from an external source.

6. The apparatus of claim 1 further comprising:

means for receiving user input specifying a particular program to be transmitted; and means for highlighting a text entry corresponding to said particular program.

7. The apparatus of claim 6 further comprising:

means for receiving user input requesting further information on said particular program; and means for displaying further information on said particular program in response to said request for further information.

8. The apparatus of claim 6 further comprising:

means for receiving user input requesting reception of said particular program; and means for selecting said particular program.

9. The apparatus of claim 1 wherein said means for receiving user input is an IR receiver.

10. A method for displaying program guide information, said method comprising the steps of:

displaying a table of program information on said screen, a first axis of said table representing a time of transmission, a second axis of said table representing a channel, wherein an entry of said table comprises an icon representing a class of program to be transmitted on the channel at the time represented by the position of said entry;

receiving user input specifying a transmission time of particular interest; and overlaying, over a section of said table corresponding to said transmission time of particular interest, a plurality of magnified text entries, each text entry including text representing the program to be transmitted at the transmission time of particular interest on the channel represented by the position of said text entry.

11. The method of claim 10 wherein said icon comprises a shape representing a class of program to be transmitted.

12. The method of claim 10 wherein said icon comprises a block having a color representing a class of program to be transmitted.

13. The method of claim 10 further comprising the steps of:

receiving user input specifying a particular program to be transmitted; and highlighting a text entry corresponding to said particular program.

14. The method of claim 13 further comprising the steps of:

receiving user input requesting further information on said particular program; and displaying further information on said particular program in response to said request for further information.

15. The method of claim 13 further comprising the steps of:

receiving user input requesting reception of said particular program; and selecting said particular program.

16. A terminal adapter coupled to a broadcast medium carrying a plurality of video programs and electronic program guide information and further coupled to a display, said terminal adapter comprising:

a display generation unit that displays a table of program information on said screen, a first axis of said table representing a time of transmission, a second axis of said table representing a channel, wherein an entry of said table comprises an icon representing a class of program to be transmitted on the channel at the time represented by the position of said entry;

a control unit that receives user input specifying a transmission time of particular interest; and said display generation unit overlaying, over a section of said table corresponding to said transmission time of particular interest, a plurality of magnified text entries, each text entry including text representing the program to be transmitted at the transmission time of particular interest on the channel represented by the position of said text entry.

17. The adapter of claim 16 wherein said icon comprises a shape representing a class of program to be transmitted.

18. The adapter of claim 16 wherein said icon comprises a block having a color representing a class of program to be transmitted.

19. The adapter of claim 16 wherein said control unit receives user input specifying a particular program to be transmitted; and wherein said display generation unit highlights a text entry corresponding to said particular program.

20. The adapter of claim 19 wherein said control unit receives user input requesting further information on said particular program; and wherein said display unit displays further information on said particular program in response to said request for further information.

21. The adapter of claim 19 wherein said control unit receives user input requesting reception of said particular program; and further comprising: a tuner that selects said particular program.

22. The adapter of claim 16 wherein said control unit and said display generation unit are contained within a settop unit.

23. The adapter of claim 16 wherein said control unit and said display generation unit are contained within a computer.

* * * * *